United States Patent
Zhang et al.

(10) Patent No.: US 9,395,588 B2
(45) Date of Patent: Jul. 19, 2016

(54) TRANSPARENT ELECTRODE, ARRAY SUBSTRATE AND LIQUID CRYSTAL DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Honglin Zhang, Beijing (CN); Hebin Zhao, Beijing (CN); Sha Liu, Beijing (CN); Ting Dong, Beijing (CN); Dan Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 50 days.

(21) Appl. No.: 14/348,249

(22) PCT Filed: Nov. 29, 2013

(86) PCT No.: PCT/CN2013/088217
§ 371 (c)(1),
(2) Date: Mar. 28, 2014

(87) PCT Pub. No.: WO2014/206005
PCT Pub. Date: Dec. 31, 2014

(65) Prior Publication Data
US 2015/0160498 A1 Jun. 11, 2015

(30) Foreign Application Priority Data

Jun. 27, 2013 (CN) .......................... 2013 1 0263460

(51) Int. Cl.
*G02F 1/1343* (2006.01)

(52) U.S. Cl.
CPC ...... *G02F 1/13439* (2013.01); *G02F 1/134309* (2013.01); *G02F 2001/134345* (2013.01); *Y10T 428/24314* (2015.01)

(58) Field of Classification Search
CPC ............ G02F 1/133707; G02F 1/1368; G02F 1/134309; G02F 1/133753; G02F 1/134336; G02F 1/1343; G02F 1/1362; G02F 2001/134372; G02F 2001/133757; G02F 2001/134345; G02F 2001/134318; G02F 2001/133761; G02F 2201/40; G02F 1/13439
USPC .......................... 349/139, 129, 142, 144, 141
See application file for complete search history.

(56) References Cited

U.S. PATENT DOCUMENTS

| 6,507,383 B1 * | 1/2003 | Abe .................. G02F 1/134363 |
| | | 349/138 |
| 2008/0001883 A1 | 1/2008 | Kim et al. |

(Continued)

FOREIGN PATENT DOCUMENTS

| CN | 101097333 A | 1/2008 |
| CN | 102629060 A | 8/2012 |
| CN | 103323988 A | 9/2013 |

(Continued)

OTHER PUBLICATIONS

International Search Report issued Mar. 17, 2014; PCT/CN2013/088217.

(Continued)

*Primary Examiner* — Thoi Duong
(74) *Attorney, Agent, or Firm* — Ladas & Parry LLP

(57) ABSTRACT

Embodiments of the invention provide a transparent electrode, an array substrate and a liquid crystal display device. The transparent electrode includes a first-domain display region and a second-domain display region that are adjacent to each other, openings are respectively formed in the first-domain display region and the second-domain display region of the transparent electrode so that the transparent electrode has a first slit extending in a first direction in the first-domain display region and a second slit extending in a second direction different from the first direction in the second-domain display region. Additional openings are further formed at a region between the first-domain display region and the second-domain display region of the transparent electrode, so that a third slit extending in a third direction and a fourth slit extending in a fourth direction different from the third direction are formed at this region.

20 Claims, 2 Drawing Sheets

(56) References Cited

U.S. PATENT DOCUMENTS

2009/0185125 A1     7/2009   Hida et al.
2009/0310076 A1*   12/2009   Hsieh ................ G02F 1/134309
                                                                                        349/144

FOREIGN PATENT DOCUMENTS

CN        203287663 U     11/2013
JP         2009-223099 A    10/2009

OTHER PUBLICATIONS

First Chinese Office Action dated Mar. 24, 2015; Appln. No. 201310263460.9.

Second Chinese Office Action Appln. No. 201310263460.9; Dated Nov. 23, 2015.

International Preliminary Report on Patentability Appln. No. PCT/CN2013/088217; Dated Dec. 29, 2015.

* cited by examiner

TRANSPARENT ELECTRODE, ARRAY SUBSTRATE AND LIQUID CRYSTAL DISPLAY DEVICE

TECHNICAL FIELD

Embodiments of the invention relate to transparent electrode, an array substrate and a liquid crystal display device.

BACKGROUND

Advanced Super Dimensional Switching (ADS for short) technology is capable of achieving in-plane electric field and wide view angle. In a liquid crystal display device of ADS mode, a multi-dimensional electric field is formed with both an electric field generated at edges of slit electrodes in a same plane and an electric field generated between a slit electrode layer and a plate-like electrode layer, so that liquid crystal molecules at all orientations, which are provided directly above the electrodes or between the slit electrodes in a liquid crystal cell, can be rotated, In this way, the work efficiency of liquid crystal can be enhanced.

At present, in an array substrate of the liquid crystal display device of ADS mode, each sub-pixel has a transparent electrode. As shown in FIG. 1, the transparent electrode 1 comprises a first-domain display region 11 and a second-domain display region 12 that are adjacent to each other. Openings are respectively formed in the first-domain display region 11 and the second-domain display region 12 so that the transparent electrode 1 has slits of different directions in the first-domain display region 11 and the second-domain display region 12. That is, the transparent electrode 1 is configured as a so-called slit electrode. However, as shown in FIG. 1, a region of the transparent electrode 1 that is between the first-domain display region 11 and the second-domain display region 12 is an integral structure without any openings so that the liquid crystal molecules at this region are arranged irregularly, and thus the transmittance of the display device is decreased.

SUMMARY OF THE INVENTION

According to an embodiment of the invention, a transparent electrode is provided. The transparent electrode comprises a first-domain display region and a second-domain display region that are adjacent to each other, openings are respectively formed in the first-domain display region and the second-domain display region of the transparent electrode so that the transparent electrode has a first slit extending in a first direction in the first-domain display region and a second slit extending in a second direction different from the first direction in the second-domain display region. Additional openings are further formed at a region between the first-domain display region and the second-domain display region of the transparent electrode, so that a third slit extending in a third direction and a fourth slit extending in a fourth direction different from the third direction are formed at this region between the first-domain display region and the second-domain display region of the transparent electrode.

For example, the third slit is parallel to the first slit.
For example, the fourth slit is parallel to the second slit.
For example, the third slit is communicated with the fourth slit.
For example, the transparent electrode is a pixel electrode or a common electrode.
For example, in a width direction of the transparent electrode, a distance between an edge of the transparent electrode and an edge of the slit on a same side of the transparent electrode is smaller than 4.1 μm.

For example, in the width direction of the transparent electrode, the distance between the edge of the transparent electrode and the edge of the slit on the same side of the transparent electrode is equal to 3.5 μm.

For example, the transparent electrode is formed of ITO.

According to another embodiment of the invention, an array substrate is provided. The array substrate comprises a pixel electrode and a common electrode, the pixel electrode or the common electrode comprises a plurality of the above-mentioned transparent electrodes, and each transparent electrode corresponds to one sub-pixel.

According to still another embodiment of the invention, a liquid crystal display device is provided. The liquid crystal display device comprises the above-mentioned array substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 2:
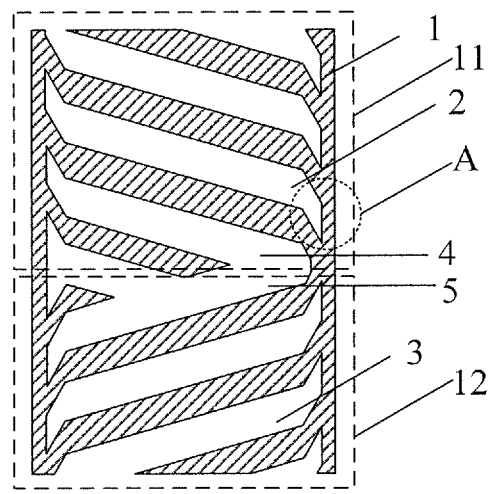
FIG. 2 is a schematic view illustrating a transparent electrode according to an embodiment of the invention.

As shown in FIG. 2, a transparent electrode 1 according to an embodiment of the invention comprises a first-domain display region 11 and a second-domain display region 12 that are adjacent to each other. Openings are respectively formed in the first-domain display region 11 and the second-domain display region 12 of the transparent electrode 1, so that the transparent electrode 1 has a first slit 2 extending in a first direction in the first-domain display region 11 and a second slit 3 extending in a second direction different from the first direction in the second-domain display region 12. In addition, additional openings are further formed at a region between the first-domain display region 11 and the second-domain display region 12 of the transparent electrode 1, so that a third slit 4 extending in a third direction and a fourth slit 5 extending in a fourth direction different from the third direction are formed at this region.

For example, the third slit 4 may be parallel to the first slit 2 and the fourth slit 5 may be parallel to the second slit 3, so that the transparent electrode 1 may be formed more easily.

For example, the third slit 4 may be communicated with the fourth slit 5.

For example, the transparent electrode 1 may be formed of transparent materials such as Indium Tin Oxide (ITO) and the like.

Figure 1:
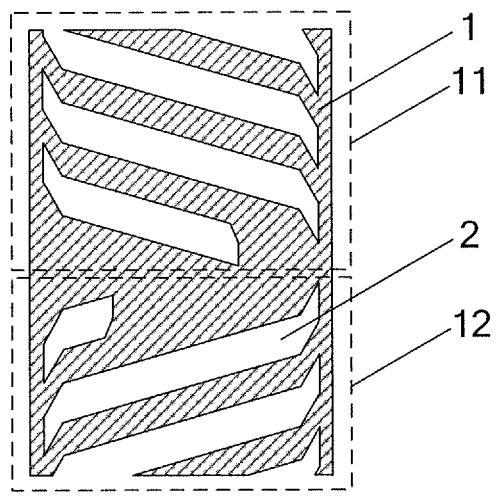
FIG. 1 is a schematic view illustrating a conventional transparent electrode.

As shown in FIG. 1, in the conventional technology, the region between the first-domain display region and the second-domain display region that are adjacent to each other has the integral structure without any openings, so that the liquid crystal molecules are arranged irregularly at this region. However, in the transparent electrode according to the embodiment of the invention, the region of the transparent electrode 1 between the first-domain display region 11 and the second-domain display region 12 that are adjacent to each other has additional openings, so that slits are provided at this region as well. In this way, the region in which the liquid crystal molecules are arranged irregularly can be reduced, and the transmittance of the liquid crystal display panel can be increased.

For example, the transparent electrode as described above may be a pixel electrode or a common electrode.

Figure 3:
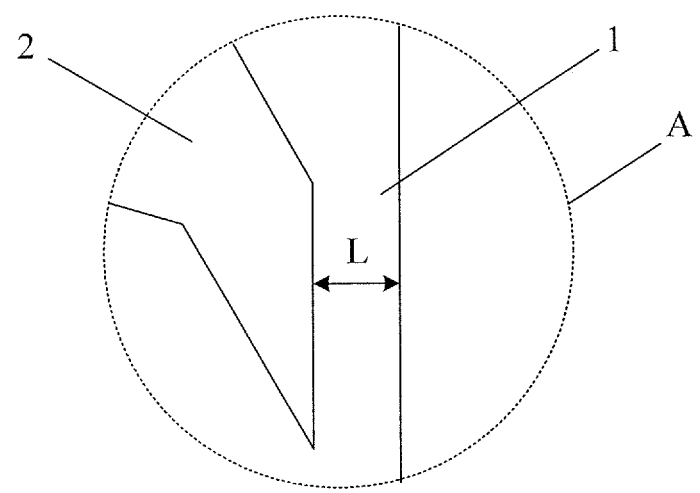
FIG. 3 is an enlarged view illustrating a region A in FIG. 2.

In addition, as shown in FIG. 3, in a width direction of the transparent electrode 1, a distance L between an edge of the transparent electrode 1 and an edge of the slit 2 on a same side of the transparent electrode 1 is smaller than 4.1 μm. Due to the limit caused by the manufacture process, L is larger than 2.9 μm.

Preferably, in the width direction of the transparent electrode 1, the distance L between the edge of the transparent electrode 1 and the edge of the slit 2 on the same side of the transparent electrode 1 is 3.5 μm.

According to measurement results, the transmittance of the transparent electrode 1 according to the embodiment of the invention is increased by 3%-5% while keeping the satisfactory display property.

It should be noted that, FIG. 2 illustrates that each transparent electrode comprises display regions of two domains as an example. In practice, each transparent electrode may comprise display regions of more domains, and in this case, the transparent electrode according to the embodiment of the invention can also be employed as long as the opening is provided at the region between adjacent domains.

In the transparent electrode according to the embodiment of the invention, the opening is provided at the region between the adjacent domains so that the slit is formed at the region between the adjacent domains as well. In this way, the region in which the liquid crystal molecules are arranged irregularly can be reduced, and the transmittance of the liquid crystal display panel can be increased. In addition, the region in which the liquid crystal molecules are arranged irregularly between adjacent sub-pixels can be reduced by reducing the width of the edge of the transparent electrode, so that the transmittance of the liquid crystal display can be further increased.

An embodiment of the invention provides an array substrate. The array substrate comprises a pixel electrode and a common electrode, the pixel electrode or the common electrode comprises a plurality of the above-mentioned transparent electrodes, and each transparent electrode corresponds to one sub-pixel. In the case that the pixel electrode comprises the plurality of the above-mentioned transparent electrodes to be formed as a slit electrode, the common electrode is formed as a plate electrode. In the case that the common electrode comprises the plurality of the above-mentioned transparent electrodes to be formed as the slit electrode, the pixel electrode is formed as the plate electrode.

It should be noted, the structure and the operation principle of the transparent electrode employed in the array substrate are similar to those of the above-mentioned transparent electrode, and the details thereof are omitted here for simplicity. The array substrate may be applied to any display device having the slit electrode, for example, the array substrate may be applied to the liquid crystal display panel of ADS mode. The improvements for the ADS technology comprise an I-ADS technology having high transmittance, an H-ADS technology having high aperture ratio and an S-ADS technology having a high resolution.

In the array substrate according to the embodiment of the invention, the opening is provided at the region between the adjacent domains so that the slit is formed at the region between the adjacent domains as well. In this way, the region in which the liquid crystal molecules are arranged irregularly can be reduced, and the transmittance of the liquid crystal display panel can be increased.

An embodiment of the invention provides a liquid crystal display device. The liquid crystal display device comprises the above-mentioned array substrate.

The structure and the operation principle of the array substrate employed in the liquid crystal display device are similar to those of the above-mentioned array substrate, and the details thereof are omitted here for simplicity. For example, the liquid crystal display device may be a liquid crystal display panel, a mobile phone, a tablet computer, a television, a display, a notebook computer, a digital photo frame, a navigator, or any other products or components having display function.

In the liquid crystal display device according to the embodiment of the invention, the opening is provided at the region between the adjacent domains so that the slit is formed at the region between the adjacent domains as well. In this way, the region in which the liquid crystal molecules are arranged irregularly can be reduced, and the transmittance of the liquid crystal display panel can be increased The foregoing embodiments merely are exemplary embodiments of the invention, and not intended to define the scope of the invention, and the scope of the invention is determined by the appended claims.

What is claimed is:

1. A transparent electrode, comprising a first-domain display region and a second-domain display region that are adjacent to each other, openings being respectively formed in the first-domain display region and the second-domain display region of the transparent electrode so that the transparent electrode has a first slit extending in a first direction in the first-domain display region and a second slit extending in a second direction different from the first direction in the second-domain display region, wherein additional openings are further formed at a region between the first-domain display region and the second-domain display region of the transparent electrode, so that a third slit extending in a third direction and a fourth slit extending in a fourth direction different from the third direction are formed at the region between the first-domain display region and the second-domain display region of the transparent electrode, and wherein the first slit, the second slit, the third slit and the fourth slit form a slit pattern, and the slit pattern has a "V" shape and comprises a slit extension, the slit extension extends from a side of the "V" shape to an inside of the "V" shape and extends continuously from the second-domain display region to the first-domain display region.

2. The transparent electrode according to claim 1, wherein the third slit is parallel to the first slit.

3. The transparent electrode according to claim 2, wherein the fourth slit is parallel to the second slit.

4. The transparent electrode according to claim 2, wherein the third slit is communicated with the fourth slit.

5. The transparent electrode according to a claim 2, wherein the transparent electrode is a pixel electrode or a common electrode.

6. The transparent electrode according to claim 2, wherein in a width direction of the transparent electrode, a distance between an edge of the transparent electrode and an edge of the slit on a same side of the transparent electrode is smaller than 4.1 µm.

7. The transparent electrode according to claim 1, wherein the fourth slit is parallel to the second slit.

8. The transparent electrode according to claim 7, wherein the third slit is communicated with the fourth slit.

9. The transparent electrode according to a claim 7, wherein the transparent electrode is a pixel electrode or a common electrode.

10. The transparent electrode according to claim 7, wherein in a width direction of the transparent electrode, a distance between an edge of the transparent electrode and an edge of the slit on a same side of the transparent electrode is smaller than 4.1 µm.

11. The transparent electrode according to claim 1, wherein the third slit is communicated with the fourth slit.

12. The transparent electrode according to a claim 11, wherein the transparent electrode is a pixel electrode or a common electrode.

13. The transparent electrode according to claim 11, wherein in a width direction of the transparent electrode, a distance between an edge of the transparent electrode and an edge of the slit on a same side of the transparent electrode is smaller than 4.1 µm.

14. The transparent electrode according to a claim 1, wherein the transparent electrode is a pixel electrode or a common electrode.

15. The transparent electrode according to claim 14, wherein in a width direction of the transparent electrode, a distance between an edge of the transparent electrode and an edge of the slit on a same side of the transparent electrode is smaller than 4.1 µm.

16. The transparent electrode according to claim 1, wherein in a width direction of the transparent electrode, a distance between an edge of the transparent electrode and an edge of the slit on a same side of the transparent electrode is smaller than 4.1 µm.

17. The transparent electrode according to claim 16, wherein in the width direction of the transparent electrode, the distance between the edge of the transparent electrode and the edge of the slit on the same side of the transparent electrode is equal to 3.5 µm.

18. The transparent electrode according to claim 1, wherein the transparent electrode is formed of ITO.

19. An array substrate, comprising a pixel electrode and a common electrode, wherein the pixel electrode or the common electrode comprises a plurality of transparent electrodes according to claim 1, and each transparent electrode corresponds to one sub-pixel.

20. A liquid crystal display device, comprising an array substrate according to claim 19.

\* \* \* \* \*